United States Patent
Hodgetts et al.

(10) Patent No.: US 6,634,885 B2
(45) Date of Patent: Oct. 21, 2003

(54) FLIGHT SIMULATORS

(75) Inventors: Graham L. Hodgetts, Baden, PA (US); Gary L. Van Drie, Sewickley, PA (US)

(73) Assignee: Fidelity Flight Simulation, Inc., Pittsburgh, PA (US)

( * ) Notice: Subject to any disclaimer, the term of this patent is extended or adjusted under 35 U.S.C. 154(b) by 120 days.

(21) Appl. No.: 09/766,499

(22) Filed: Jan. 19, 2001

(65) Prior Publication Data

US 2002/0055086 A1 May 9, 2002

Related U.S. Application Data

(60) Provisional application No. 60/177,173, filed on Jan. 20, 2000.

(51) Int. Cl.$^7$ .................................................. G09B 9/00
(52) U.S. Cl. .............................. 434/55; 434/29; 434/30; 700/28
(58) Field of Search .............................. 434/29, 30, 33, 434/38, 40, 44, 46, 55, 58, 59, 60, 66, 69, 307 R, 308; 473/130; 273/442; 700/28; 701/300; 703/8

(56) References Cited

U.S. PATENT DOCUMENTS

| | | |
|---|---|---|
| 2,373,313 A | 4/1945 | Jeandron |
| 2,938,279 A | 5/1960 | Hemstreet et al. |
| 3,591,933 A | 7/1971 | Ebeling |
| 3,610,797 A | 10/1971 | Ebeling |
| 4,164,080 A * | 8/1979 | Kosydar et al. ............... 434/38 |
| 4,418,911 A | 12/1983 | Bowers et al. |
| 4,446,480 A | 5/1984 | Breglia et al. |
| 4,559,014 A | 12/1985 | Campbell |
| 4,710,128 A * | 12/1987 | Wachsmuth et al. .......... 434/46 |
| 4,751,662 A | 6/1988 | Crosbie |
| 4,853,863 A * | 8/1989 | Cohen et al. ................ 701/300 |
| 5,021,982 A * | 6/1991 | Crosbie et al. ................. 703/8 |
| 5,179,525 A | 1/1993 | Griffis et al. |
| 5,353,242 A | 10/1994 | Crosbie et al. |
| 5,366,375 A | 11/1994 | Sarnicola |
| 5,433,608 A * | 7/1995 | Murray ......................... 434/29 |
| 5,453,011 A * | 9/1995 | Feuer et al. ................... 434/38 |
| 5,490,784 A * | 2/1996 | Carmein ....................... 434/55 |
| 5,695,406 A | 12/1997 | Park |
| 5,752,834 A | 5/1998 | Ling |
| 5,791,903 A * | 8/1998 | Feuer et al. ................... 434/38 |
| 5,810,596 A | 9/1998 | Van Lookeren Campagne |
| 5,857,917 A | 1/1999 | Francis et al. |
| 5,860,807 A * | 1/1999 | McFarland et al. ........... 434/33 |
| 5,931,739 A | 8/1999 | Layer et al. |
| 5,954,508 A | 9/1999 | Lo et al. |
| 6,027,342 A | 2/2000 | Brown |
| 6,431,872 B1 * | 8/2002 | Shiraishi et al. .............. 434/69 |
| 6,445,960 B1 * | 9/2002 | Borta ........................... 700/28 |

* cited by examiner

Primary Examiner—Joe H. Cheng
(74) Attorney, Agent, or Firm—Webb Ziesenheim Logsdon Orkin & Hanson, P.C.

(57) ABSTRACT

A method and apparatus for scaling a large commercial flight simulator into a more compact flight simulator, without losing the look and feel of a corresponding aircraft in-flight, by modifying movement of the motion platform to conform to the recommendations of one knowledgeable of the actual aircraft.

12 Claims, 5 Drawing Sheets

FLIGHT SIMULATORS

CROSS-REFERENCE TO RELATED APPLICATION

The present application claims the benefit of earlier filed U.S. Provisional Patent Application Serial No. 60/177,173, filed Jan. 20, 2000, entitled "Inexpensive Motion Base and Driver Technology for Flight Simulators."

BACKGROUND OF THE INVENTION

1. Field of the Invention

The present invention relates to motion simulators and, more particularly, to motion simulators which mimic perceived movements of an aircraft in-flight.

2. Brief Description of the Prior Art

Motion simulators are generally known. Examples include U.S. Pat. No. 6,027,342 to Brown; U.S. Pat. No. 5,954,508 to Lo et al.; and U.S. Pat. No. 5,857,917 to Francis et al.

As generally discussed in the Lo et al. patent, motion simulators fall into the categories of commercial motion simulators and amusement motion simulators. Commercial motion simulators are large, complex, and are generally driven by hydraulic actuators. Conversely, amusement motion simulators are scaled-down versions of the larger commercial motion simulators. The Lo et al. patent further discloses that commercial motion simulators may be transformed into less complicated amusement motion simulators by reducing range of motion.

When comparing the trade-off between size, complexity, and range of motion, it is important to consider the particular application. Many aircraft motion simulators employ large hydraulic-driven actuators having a range of motion of up to three feet or more. This range of motion has historically been needed to make movement perceived by a pilot in the simulator mimic movement perceived by a pilot during actual flight conditions. This degree of realism is required to fulfill safety requirements, FAA qualification requirements, and training goals. Conversely, amusement motion simulators do not require demanding precision because the purpose of amusement is to entertain, not train. The continuing problem, however, is scaling down the cost and the complexity of a commercial motion simulator without significantly sacrificing realistic movement of the simulator, as perceived by a pilot.

SUMMARY OF THE INVENTION

It is, therefore, an object of the present invention to provide an inexpensive motion base and driver technology for a flight simulator, which does not significantly sacrifice the realistic perceived movement of a larger, more complex commercial motion simulator.

One method is to make a perceived movement of a motion platform correspond to a perceived movement of an actual vehicle in motion, the motion platform connected to a computer, includes the steps of executing simulation software programmed in the computer, transmitting an output of the computer to the motion platform, evaluating the perceived movement of the motion platform, and adjusting the output of the computer until the perceived movement of the motion platform corresponds to the perceived movement of the actual vehicle.

DESCRIPTION OF THE PREFERRED EMBODIMENTS

The present invention is a method and apparatus for producing simulated motion, such as simulating the motion of an aircraft in-flight.

Figure 1:
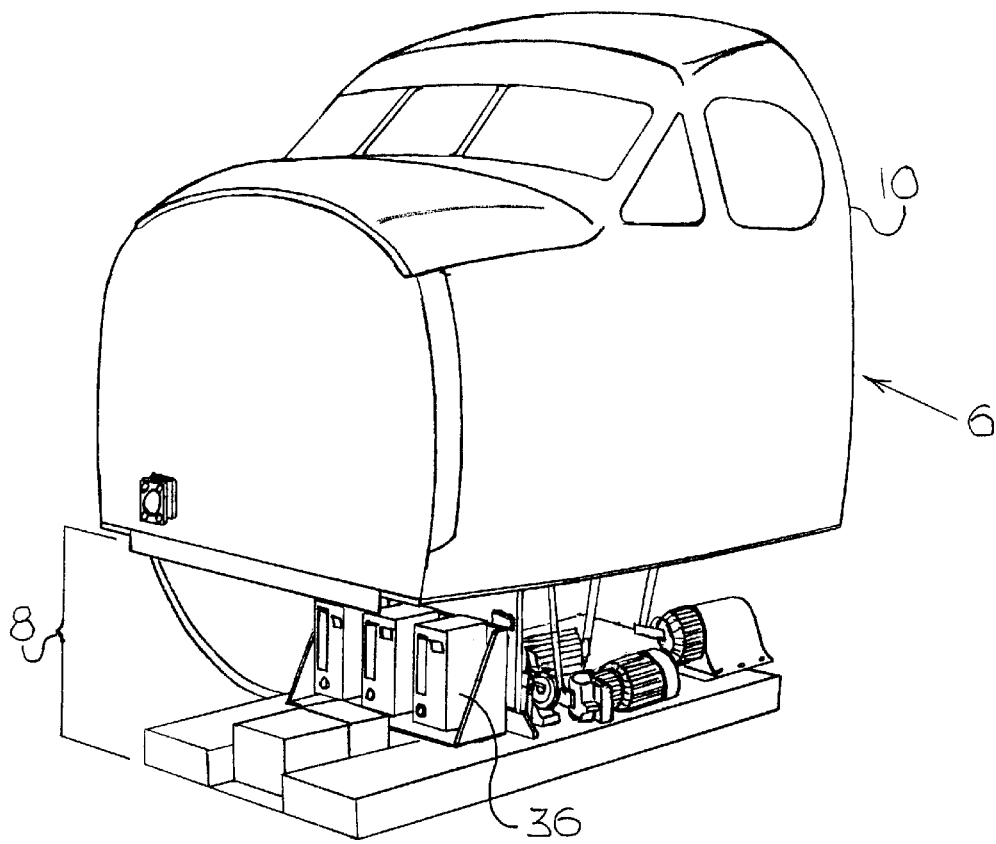
FIG. 1 is an elevation view of a simulated cockpit and motion base of a flight simulator according to one embodiment of the present invention.
Figure 2:
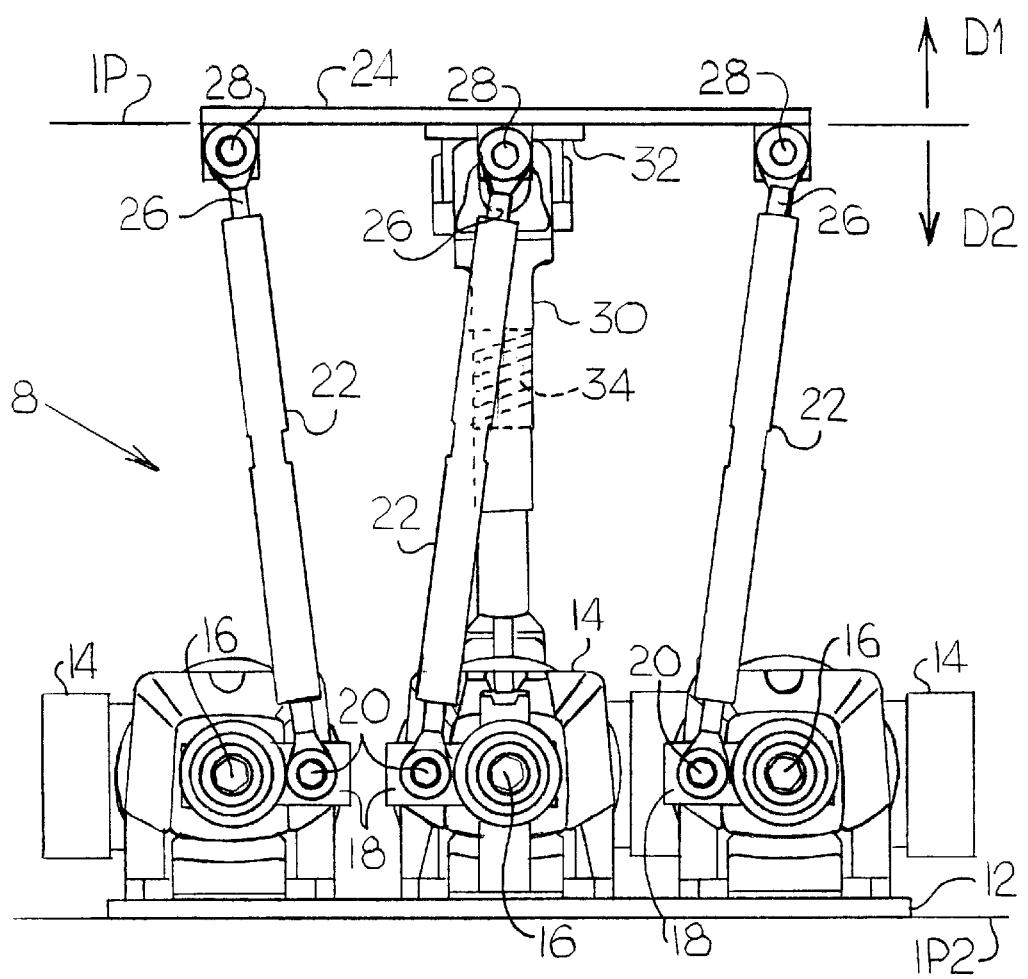
FIG. 2 is a side elevation view of the motion base shown in FIG. 1.

FIG. 1 shows a simulator 6 having a motion base 8 and a simulated cockpit 10, each commercially available from Servos & Simulation, Inc., 111 Atlantic Annex Point, Maitland, Fla. The motion base 8, shown in greater detail in FIGS. 2–3, includes a base plate 12. Positioned adjacent to the base plate 12 is at least one electric motor 14 having a rotatable motor shaft 16. One suitable electric motor 14 is commercially available from Nord Gear Ltd., 800 Nord Drive, Waunakee, Wis. Fixed to the motor shaft 16 is a motor arm 18. The motor arm 18 is also pivotally connected to one end 20 of an actuator 22. Alternatively, the actuator 22 can be pivotally connected directly to the motor shaft 16. As shown in FIG. 2, a motion platform 24 is pivotally connected to an opposite end 26 of the actuator 22 via a pivot joint 28.

Figure 3:
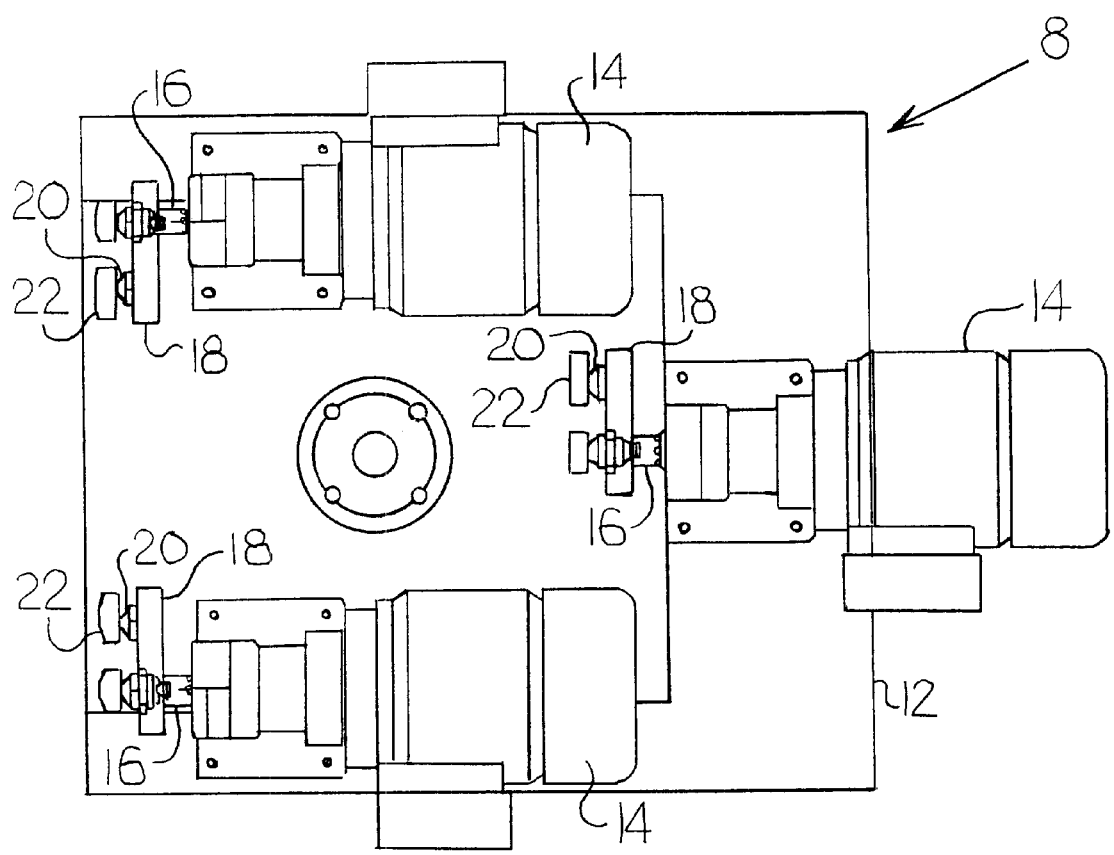
FIG. 3 is a top view of the motion base shown in FIGS. 1 and 2.
Figure 4:
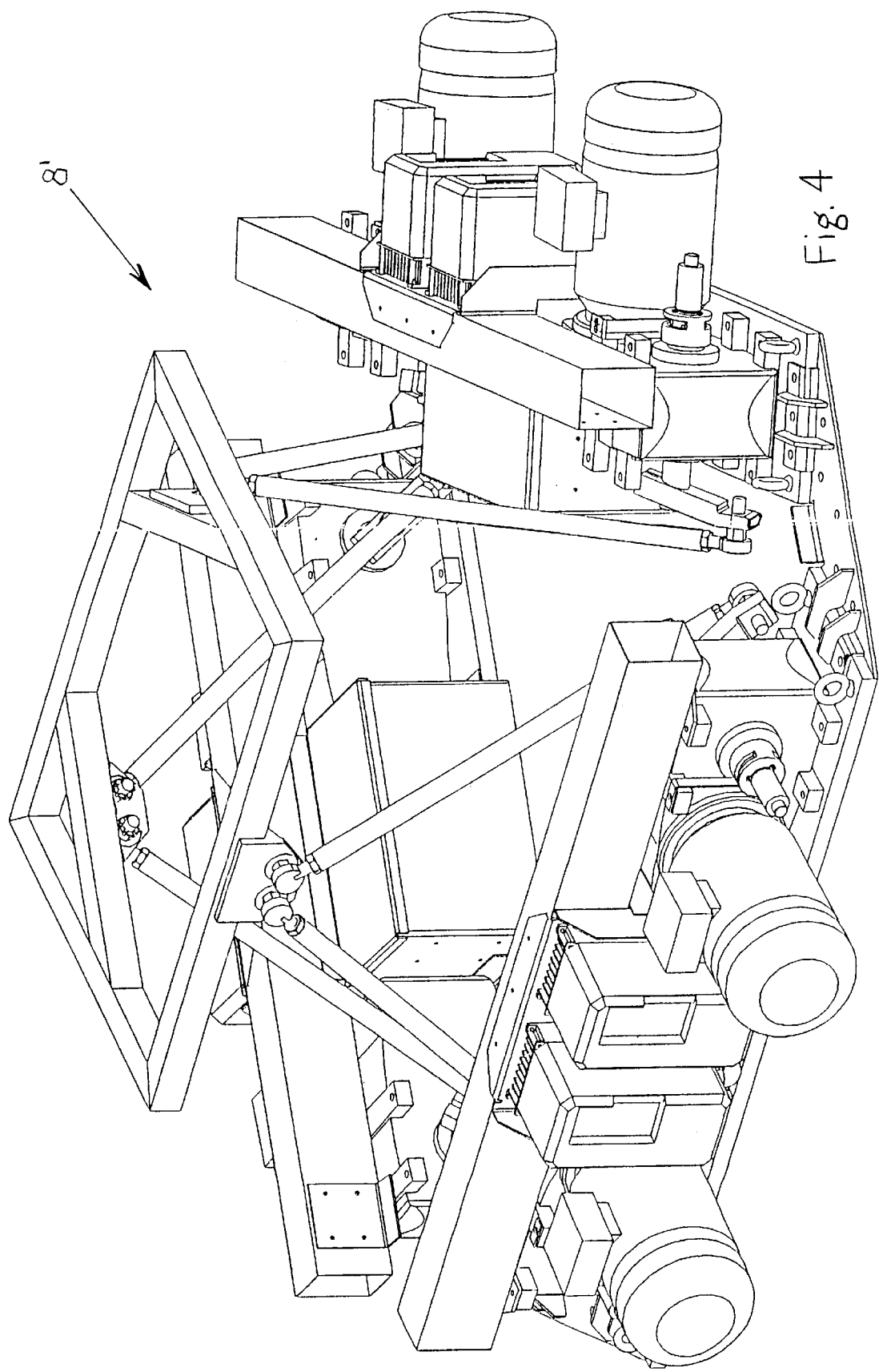
FIG. 4 is a top perspective view of a second embodiment motion base according to another embodiment of the present invention

FIGS. 2–3 show three electric motors 14 positioned adjacent to the base plate 12, each configured with a corresponding actuator 22. In this arrangement, the motion platform 24 has three degrees of freedom. In aircraft simulation terminology, these degrees of freedom are referred to as roll, pitch, and heave. If more degrees of freedom are desired, such as yaw, sway, and surge in aircraft terminology, more electric motors 14 and corresponding actuators 22 can be added, such as a six degree of freedom motion base 8' shown FIG. 4.

Referring again to FIG. 2, each electric motor 14 and corresponding actuator 22 is designed to simultaneously move the motion platform 24 approximately four to eight inches in the D1 and D2 vertical directions, as measured from an imaginary plane IP lying coincident with the motion platform 24 when the imaginary plane IP and the motion platform 24 are both positioned parallel to a second imaginary plane IP2 lying coincident with the base plate 12.

A support rod 30 is positioned between the base plate 12 and the motion platform 24. The support rod 30 is preferably fixed to the base plate 12 at one end and is pivotally connected to the motion platform 24 at an opposite end, preferably via a second pivot joint 32. The support rod 30 may be further equipped with a spring 34 to absorb weight or dampen motion of the motion platform 24. An alternating current variable frequency drive 36, shown in FIGS. 1 and 5, is electrically connected to the electric motor or motors 14.

Figure 5:
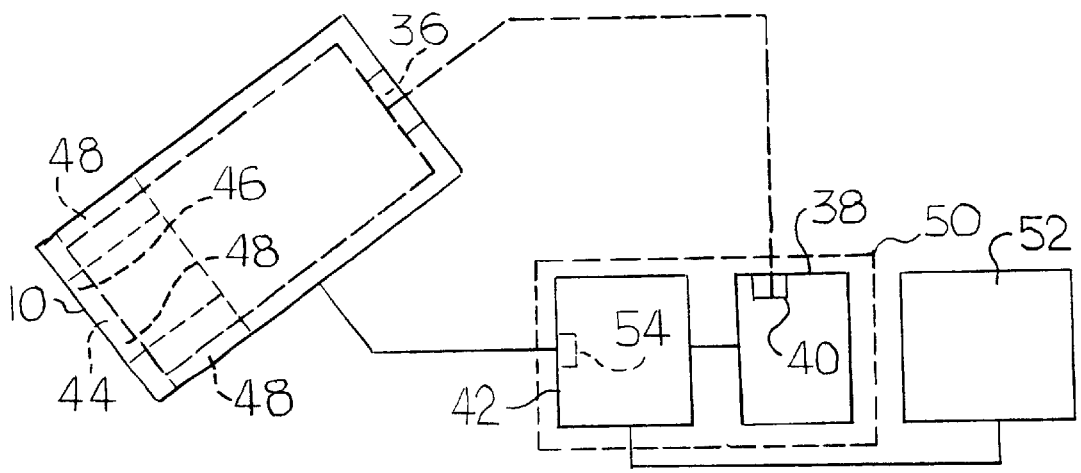
FIG. 5 is a schematic view of the flight simulator shown in FIG. 1 connected to computers and a display monitor.

With continuing reference to FIG. 5, the alternating current variable frequency drive 36 is also connected to a motion computer 38 through a digital/analog serial output card 40 or other suitable device. The motion computer 38 is programmed with proprietary motion software, described below. Connected to the motion computer 38 is a simulation computer 42 programmed with a simulation program, such as the ELITE PROP 6.0 brand of flight simulation software commercially available from 617 N. Semoran Boulevard, Orlando, Fla. However, any suitable simulation program containing a flight model can be used for flight simulation applications. The motion computer 38 and the simulation computer 42 can be separate computers, or the motion computer 38 and the simulation computer 42 can be combined together into a unitary computer 50.

Figure 6:
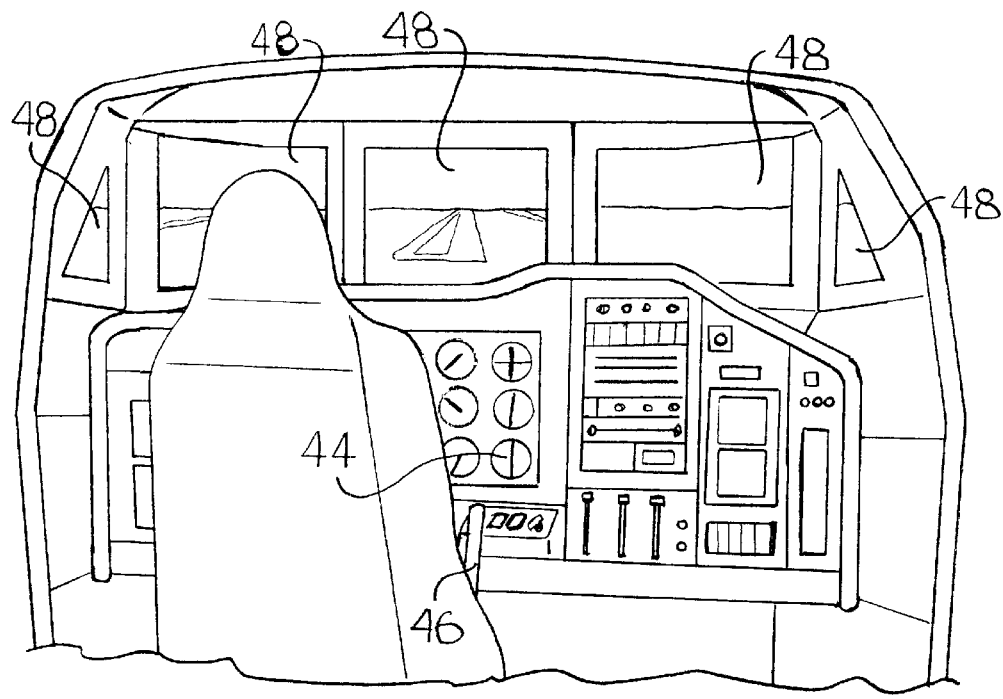
FIG. 6 is an elevation view of the simulated cockpit shown in FIG. 1.

The simulation computer 42 is connected to the simulated cockpit 10, and more specifically, to the simulated flight instruments 44, simulated aircraft controls 46, and the one or more video display screens 48, shown in FIGS. 5 and 6. The video display screens 48 are preferably positioned so that a pilot can view the video display screens 48 directly and peripherally. The direct and peripheral video cues, along with gravitational forces and inner ear changes, help to create the perception of motion and orientation. As shown in FIG. 5, a second video display screen 52 may also be connected to the simulation computer 42 for instructor monitoring purposes.

With continuing reference to FIG. 5, the simulation program, such as a flight simulator program, is executed on the simulation computer 42. The simulation program receives movement data from the simulated flight instrumentation and simulated aircraft controls 44, 46 through serial ports 54 in the simulation computer 42. The simulation program generates graphical images which are displayed on the video display screens 48 inside the simulated cockpit 10, on the optional second video display screen 52, and as simulated flight instruments 44. The movement data is also sent to the motion computer 38, preferably in the form of a code having one or more characteristics. The motion software converts the code, such as a digital code, into plus or minus 5 volt DC drive signal voltages, which are inverted by the alternating current variable frequency drive 36 and received by one or more of the electric motors 14. Each corresponding electric motor 14 then rotates the corresponding motor shaft 16 an appropriate amount, moving the motion platform 24 via the corresponding actuator 22.

The following table shows a fifteen characteristic code corresponding to one possible flight simulator application. All values are relative to an imaginary aircraft.

TABLE 1

Example of a Fifteen Characteristic Code
for a Flight Simulation Application

| Characteristic | Description | +/− Values |
| --- | --- | --- |
| A | Header | Identifies program |
| B | True airspeed | N/A |
| C | Angle of attack in degrees | +/− |
| D | Pitch acceleration in degrees per second$^2$ | + up, − down |
| E | YAW acceleration in degrees per second$^2$ | + right, − left |
| F | Roll acceleration in degrees per second$^2$ | + right, − left |
| G | X axis acceleration in feet per second$^2$ | + up, − down |

TABLE 1-continued

Example of a Fifteen Characteristic Code
for a Flight Simulation Application

| Characteristic | Description | +/− Values |
| --- | --- | --- |
| H | Y axis acceleration in feet per second$^2$ | + up, − down |
| I | Z axis acceleration in feet per second$^2$ | + forward |
| J | If/Then statement | If 1, gear on ground |
| K | Pitch | Up in degrees |
| L | YAW angle | + right, − left |
| M | Roll angle | + right, − left |
| N | Last ASCII code entered | N/A |
| O | Check sum | N/A |

As an example, the character of the code corresponding to angle of attack has a numerical value, which is either zero, positive, or negative. If the numerical value is positive, one or more of the electric motors 14 and the corresponding actuator or actuators 22 move the motion platform 24 to create the perception of an aircraft moving in a nose-up orientation. Conversely, if the numerical value of the character is negative, the motion platform 24 moves to create the perception of an aircraft moving in a nose-down orientation. An example of the characteristic code is as follows:

TABLE 2

Example Codes for T1 and T2

| Time 1 | Character | Time 2 | Character |
| --- | --- | --- | --- |
| A1 | −425.000 | A2 | −425.00 |
| B1 | 64.5297 | B2 | 72.6613 |
| C1 | 4.5344 | C2 | 3.1067 |
| D1 | 0.0558 | D2 | 1.1832 |
| E1 | −0.1733 | E2 | 4.7004 |
| F1 | 2.4731 | F2 | 3.3943 |
| G1 | 0.1151 | G2 | −0.0405 |
| H1 | 31.3273 | H2 | 31.7748 |
| I1 | 5.1007 | I2 | 4.0096 |
| J1 | 0.0000 | J2 | 0.0000 |
| K1 | 13.5849 | K2 | −30.3394 |
| L1 | 0.3091 | L2 | 1.0233 |
| M1 | −4.0029 | M2 | −62.1991 |
| N1 | 93.000 | N2 | 112.0000 |
| O1 | −779.1511 | O2 | −848.7253 |

As shown in FIG. 2, the actuator or actuators 22 only move the motion platform 24 approximately four to eight inches in the D1 and D2 directions. Therefore, motion perceived by a person inside the simulator 6 does not accurately mimic the motion that would actually be perceived if the person were operating a corresponding actual device, such as an actual aircraft in-flight. However, this problem can be corrected by adjusting the motion software, through trial and error, by someone skilled at operating the corresponding actual device.

Figure 7:
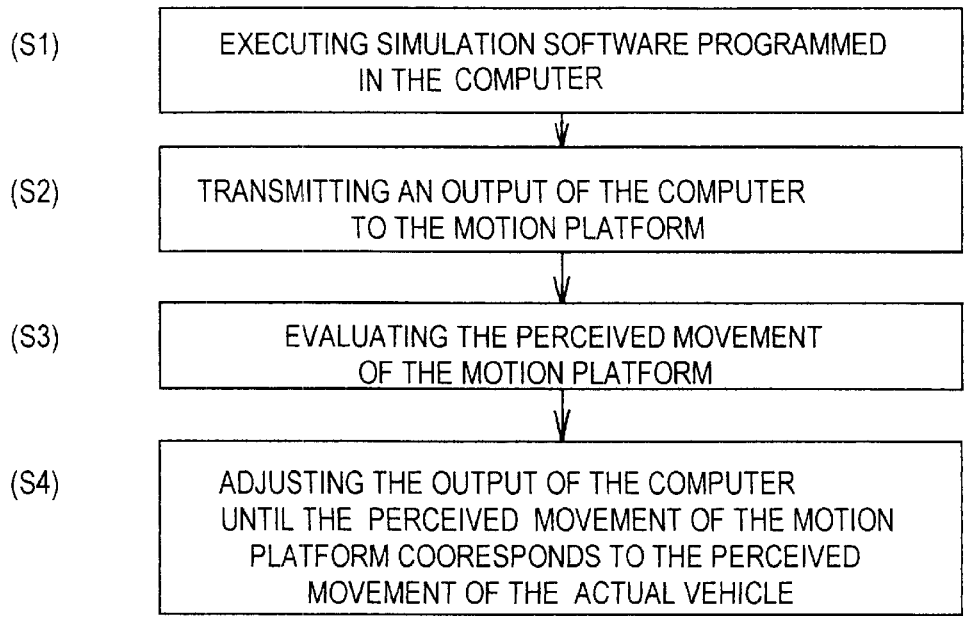
FIG. 7 is a flow chart of one method of making a movement response of a motion platform correspond to a movement response of an actual vehicle.
Figure 8:
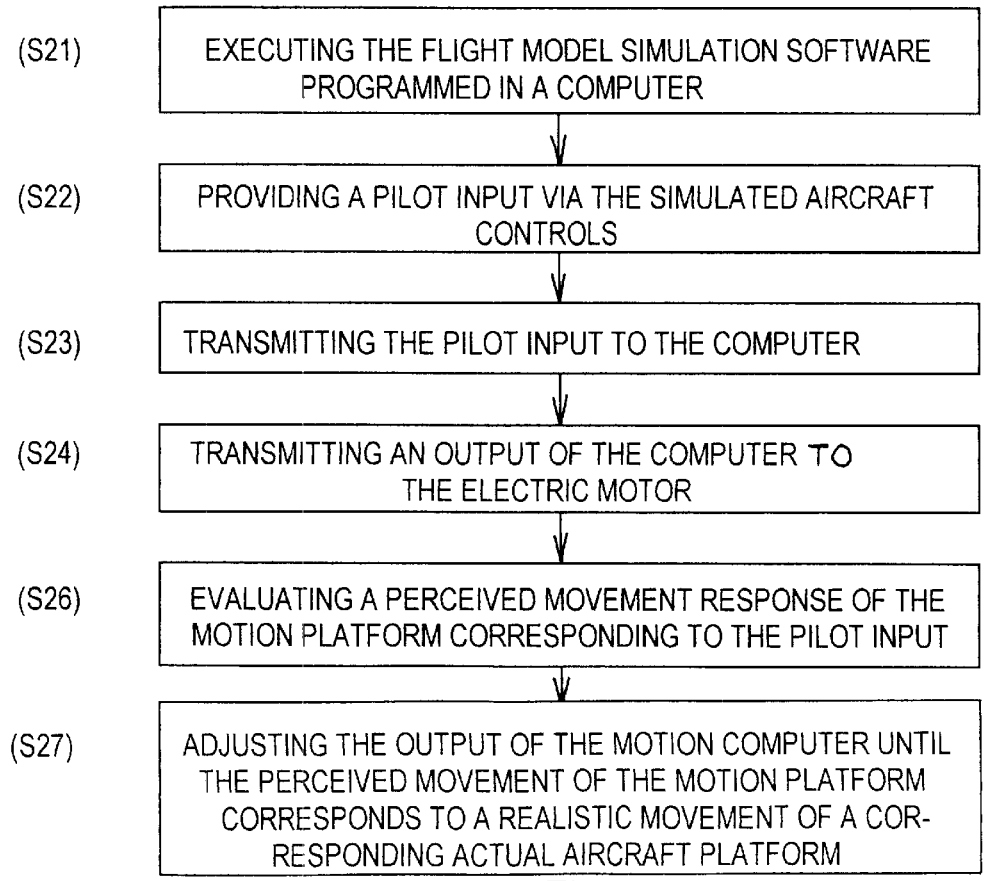
FIG. 8 is a flow chart of one method of making a movement response of a flight simulator correspond to a movement response of a corresponding actual aircraft.

In general, one method of making perceived movements of a motion platform 24 correspond to perceived movements of an actual vehicle in motion is shown in FIG. 7. FIG. 8 shows a method of making perceived movements of a flight simulator correspond to perceived movements of a corresponding actual aircraft, such as the type generally discussed above. Perceived movements are movements which are gathered by sensory organs, such as the eyes and inner ear, and transmitted to the brain. Stated another way, perceived movements are what a person in the simulator 6 or actual corresponding vehicle, such as an aircraft would see and feel.

As shown in FIG. 7, the method generally includes (S1) executing simulation software programmed in the computer; (S2) transmitting an output of the computer to the motion platform; (S3) evaluating the perceived movement of the motion platform; and (S4) adjusting the output of the computer until the perceived movement of the motion platform corresponds to the perceived movement of the actual vehicle. As stated earlier, the computer 50 can be one computing device or more than one computing device.

As an example, a pilot or other person familiar with the actual flight characteristics of a CESSNA 172 can execute a CESSNA 172 flight model software program in a simulator 6, perform various maneuvers in the simulator 6, and compare the perceived movement of the simulator 6 to what the pilot actually perceives while flying the same maneuvers in an actual airborne CESSNA 172. In the angle of attack example discussed above, if the character corresponding to angle of attack is a positive numerical value, a pilot in the simulator and a pilot flying the actual corresponding aircraft should each perceive a nose-up orientation, although the magnitude of the perceived motion will generally be different. Any difference between the movement perceived in the simulator 6 and the movement perceived while flying the actual corresponding aircraft is then corrected by adjusting the numerical value of the appropriate character of the code corresponding to angle of attack.

Another example is washout. If a passenger in an airborne CESSNA 172 closes his or her eyes and a pilot enters into a turn by banking the aircraft, the passenger would feel centrifugal force as the turn was initiated. However, once the turn is established, the passenger would not know he or she was in a turn. To simulate this effect, the numerical value of the character of the code corresponding to the roll axis is decreased while the numerical value of the character of the code corresponding to pitch is kept sufficiently large to simulate the gravitational effects which would be felt during actual flight. Other flight characteristics of the flight model can also be adjusted, as appropriate, to provide a realistic perceived movement.

Once modifications to the code have been determined, the adjustments can be assigned to the particular flight model simulator software being run in the simulator 6, based on the manufacturer and the program type. For example, a MICROSOFT brand of flight simulation software can be executed and the motion software adjusted, as discussed above. The adjusted motion program can then be loaded with the corresponding flight model software each time the flight model program is run.

The present invention provides a compact, realistic simulation device. The electro-servo motors eliminate the need for complex hydraulic systems, and the maintenance which such systems require. Despite a movement range of approximately four to eight inches, the present invention can provide the feel of a simulator having much longer hydraulic actuators. An important aspect to the decrease in size without a loss of realism is in the modified motion program which is developed based on the difference between the calculated simulated input and what the input should really look and feel like if flying an actual aircraft. By making these modifications, the present invention handles similarly to the prior art hydraulically operated larger and more expensive simulation machine.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

We claim:

1. A flight simulator comprising:
    a motion base that comprises an electric motor having a rotatable motor shaft, an actuator ratably connected to the rotatable motor shaft, and a motion platform pivotally connected to the actuator;
    a simulated aircraft cockpit connected to the motion base; and
    computer means connected to the motion base and to the simulated aircraft cockpit, the computer means programmed with flight model simulation software, motion software, and a software program which adjusts an output of the motion software for for controlling the movement of the motion platform.

2. The flight simulator as claimed in claim 1, wherein the simulated aircraft cockpit further comprises simulated flight instruments, simulated aircraft controls, a pilot seat position, and a video display screen.

3. The flight simulator as claimed in claim 2, wherein the simulation computer is programmed with the flight model simulation software and is connected to the simulated flight instruments, the simulated aircraft controls, and video display screen.

4. The flight simulator as claimed in claim 1, further comprising an alternating current variable frequency drive electrically connected to the computer means and the electric motor.

5. The flight simulator as claimed in claim 1, wherein the computer means comprises a motion computer and a simulation computer.

6. The flight simulator as claimed in claim 5, wherein the motion computer is programmed with the motion software.

7. The flight simulator as claimed in claim 5, wherein the motion computer generates a signal which is recieved by an alternating frequency drive electrically connected to the electric motor.

8. The flight simulator as claimed in claim 7, wherein the signal is electrical.

9. The flight simulator as claimed in claim 8, wherein the signal is plus of minus 5 volt direct current.

10. The flight simulator as claimed in claim 1, wherein the simulated cockpit further comprises a second video display screen and the second video display screen is electrically connected to the computer means.

11. The flight simulator as claimed in claim 1, wherein the computer means further includes a digital/analog card, the digital/analog card connected to an alternating current variable frequency drive.

12. The flight simulator as claimed in claim 1, wherein the program which adjusts an output of the motion software contains numerical characters which are adjusted help make a preceived movement of the motion base correspond to a preceived movement of an aircraft in motion.

* * * * *

UNITED STATES PATENT AND TRADEMARK OFFICE
CERTIFICATE OF CORRECTION

PATENT NO.    : 6,634,885 B2
DATED         : October 21, 2003
INVENTOR(S)   : Graham L. Hodgetts et al.

It is certified that error appears in the above-identified patent and that said Letters Patent is hereby corrected as shown below:

<u>Column 2,</u>
Line 7, "invention" should read -- invention; --.

<u>Column 6,</u>
Line 11, "ratably" should read -- rotatably --.
Line 21, "for for" should read -- for --.
Line 43, "frequency" should read -- current frequency --.
Line 48, "of" should read -- or --.

Signed and Sealed this

Thirteenth Day of April, 2004

JON W. DUDAS
*Acting Director of the United States Patent and Trademark Office*